United States Patent Office.

AMOS D. PURINTON, OF DOVER, NEW HAMPSHIRE.

Letters Patent No. 78,691, dated June 9, 1868.

IMPROVED COMPOSITION FOR SETTING POSTS, TIMBERS, &c.

*The Schedule referred to in these Letters Patent and making part of the same.*

TO ALL PERSONS TO WHOM THESE PRESENTS MAY COME:

Be it known that I, AMOS D. PURINTON, of Dover, in the county of Strafford, and State of New Hampshire, have made a new and useful Invention having Reference to the Setting of Posts, Timbers, &c., in the earth, in order to prevent such from being heaved by frost, and also to preserve such posts or timbers from decay and the ravages of worms or insects; and I do hereby declare the same to be fully described, as follows:

In carrying out my invention, I thoroughly mix together clay, water, and pyroligneous acid, in the proportions of one gallon of the acid to thirty gallons of water, and a sufficient amount of dry clay to make a mortar. If the clay is wet or moist when used, the amount of water to be employed with it will depend on what the amount may be in the clay, the quantity necessary being such as, with the acid, will bring the mixture to the consistency required for being worked. The clay should be thoroughly ground or reduced in a pug-mill, or by any other proper means, and should be divested of any stones.

In setting a post or timber with this mixture, I run the mixture or tamp it into the hole prepared in the earth for reception of the post or timber, and in which it may be placed, taking care that such hole be of a suitable depth.

When a post has been set in pulverized clay or argillaceous mortar, prepared with an acid, as set forth, frost will not heave it, and the acid will preserve the timber from decay. The clay, after becoming dry or set, will be impervious, or nearly so, to water and frost.

Railway-sleepers, bed-timbers for sidewalks, and various other structures or parts of structures, when embedded in earth, and subject to being moved out of place or heaved by frost, may be protected therefrom by being bedded in a mass of the argillaceous mortar.

The clay, by its resistance to water, will preserve the conservative powers of the acid for a great length of time. The acid operates also to prevent animals or insects from burrowing into the clay about the post or timber, in order to bore into it, or to let water or moisture into the clay, and against that part of the post or timber which may be within it. Thus, it will be seen that the acid will be productive of very important and useful results, when so combined with clay, and used as explained.

It has generally been supposed that clay would not resist frost, or that a post, when set in clay, would be easily heaved by frost. While, under ordinary circumstances, this may be so, yet, if the clay be thoroughly pulverized, and mixed in a state of mortar, and particularly when combined with the acid, as set forth, it will be rendered resistive of frost, as explained.

What I claim as my invention is—

The above-described argillaceous composition, as well as the employment or use of it, substantially in manner, and under circumstances, and for the purpose or purposes, as described.

AMOS D. PURINTON.

Witnesses:
R. H. EDDY,
F. P. HALE, Jr.